United States Patent [19]
Ikelle et al.

[11] Patent Number: 5,995,905
[45] Date of Patent: Nov. 30, 1999

[54] SOURCE SIGNATURE DETERMINATION AND MULTIPLE REFLECTION REDUCTION

[75] Inventors: Luc Thomas Ikelle, Milton; Graham Roberts, Forest Row, both of United Kingdom

[73] Assignee: Schlumberger Technology Corporation, Sugar Land, Tex.

[21] Appl. No.: 08/875,019

[22] PCT Filed: Dec. 15, 1995

[86] PCT No.: PCT/GB95/02934

§ 371 Date: Sep. 12, 1997

§ 102(e) Date: Sep. 12, 1997

[87] PCT Pub. No.: WO96/20417

PCT Pub. Date: Jul. 4, 1996

[30] Foreign Application Priority Data

Dec. 24, 1994 [GB] United Kingdom .................... 9426255

[51] Int. Cl.⁶ .................................................. G06F 19/00
[52] U.S. Cl. ............................................... 702/16; 702/14
[58] Field of Search ................................. 367/24, 21, 28, 367/16, 22, 14; 702/14, 16

[56] References Cited

U.S. PATENT DOCUMENTS

| | | | |
|---|---|---|---|
| 4,476,550 | 10/1984 | Ziolkowski et al. | 367/21 |
| 4,887,243 | 12/1989 | Keh Pann | 367/24 |
| 5,581,514 | 12/1996 | Moldoveanu et al. | 367/16 |

FOREIGN PATENT DOCUMENTS

| | | | |
|---|---|---|---|
| 066 423 | 1/1988 | European Pat. Off. | G01V 1/02 |

OTHER PUBLICATIONS

Landr, M. and Sollie, R., Source Signature Determination by Inversion, Geophysics 57 (1992) pp. 1633–1640.

Weglein, A.B. and Secrest, B.G., Wavelet Estimation for a Multidimensional Acoustic or Elastic Earth, Geophysics 55 (1990), pp. 902–913.

Carvalho, P.M., Weglein, A.B., and Stolt, R.H., Examples of a Nonlinear Inversion Method Based on the T Matrix of Scattering Theory: Application to Multiple Suppression: Mtg. Soc. Expl. Geophys., Expanded Abstracts (1991), pp. 1319–1322.

M.Landro et al (Source signature determination by inversion) Apr. 14, 1992. ,pp. 1633–1638.

Primary Examiner—Christine Oda
Assistant Examiner—Victor J. Taylor
Attorney, Agent, or Firm—William L. Wang; Keith G. W. Smith; William B. Batzer

[57] ABSTRACT

The signature of an energy source is determined from an inverse scattering Born series representing multiple reflected energy. The series comprises a polynomial in the inverse of the signature and has recorded data as the first term. The series is truncated, preferably to the first two terms to permit an analytical determination of the signature to be found. The value of the inverse signature which minimises the energy represented by the sub-series is found and this corresponds to the desired source signature. An iterative scheme may be adopted to improve the match to the actual signature so as to take into account the errors caused by truncating the scattering series.

11 Claims, 8 Drawing Sheets

SOURCE SIGNATURE DETERMINATION AND MULTIPLE REFLECTION REDUCTION

The present invention relates to a method of determining a signature of a source of energy and to a method of reducing the effects of multiple reflected energy. Such a method may be used in medical imaging and non-destructive evaluation, where a sample is irradiated with energy, for instance in the form of x-rays or ultrasound, in order to determine the internal structure of the sample non-invasively. Such a method may also be used with marine seismic reflection data obtained by means of seismic sources and receivers located in water and towed behind a seismic exploration vessel. These methods may be used during actual surveying and/or subsequently with recorded data from such surveys.

During seismic surveying, a seismic source is repeatedly actuated and seismic receivers, such as hydrophones in marine seismic surveying, receive energy direct from the sources and reflected from various boundaries or interfaces. In the case of marine seismic surveying, energy propagates into the earth and is reflected back to the hydrophones from subterranean boundaries or interfaces, for instance between strata of different types. The recorded seismic data can be processed to reveal information about the structure of the earth in the area being surveyed. However, such reflections are contaminated by other reflection paths. For instance, energy from the sources is reflected at the sea surface directly to the hydrophones. Also, energy can be reflected more than once between the sources and the receivers. Such multiple reflections can take place within the earth. Also, energy initially travelling downwards from the sources can be reflected upwardly and then downwardly again from the surface of the sea before arriving at the hydrophones. Reflections of this type are referred to as "free-surface multiple reflections". Free-surface multiple reflections can be classified according to their order, which is equal to the number of reflections from the free-surface. Thus, first order free-surface reflections comprise energy initially travelling downwardly from the sources (as opposed to "ghosting" where energy travels upwardly and is reflected from the free-surface), is reflected upwardly from the sea bed or a boundary below the sea bed, and is then reflected downwardly from the free-surface to the hydrophones. Second order free-surface multiple reflections undergo two downward reflections from the sea-surface before being detected by the hydrophones, and so on.

In order to remove or reduce the effects of multiple reflections including free-surface multiple reflections in seismic data, a good knowledge of the seismic source signature is required. The seismic source signature is the wave shape e.g. the pressure waveform with respect to time, of the seismic energy emitted by the seismic sources. Removal or reduction of the effects of multiple reflections in seismic data is performed before "stacking", the known process of summing seismic data related to each sub-region of the region being explored so as to improve the effective signal-to-noise ratio of the data. Good knowledge of the seismic source signature also enhances other data processing techniques such as deconvolution, migration and inversion for elastic parameters. Thus, good knowledge of the seismic source signature can significantly enhance the final data processing products.

There are known techniques for determining the signature of a seismic source. One such known technique relies on a "convolution model" for seismic data, in which the model is defined as the convolution of the source signature with the impulse response of the earth (including the effects of reflections, refractions, multiples, and diffractions). This technique requires known information about some part of the sub-surface, such as the sea bottom, so as to allow estimation of the source signature to be treated as a linear inverse problem. However, such sub-surface information is often not available and the technique must then rely on statistical methods which require more severe assumptions, for instance about the phase of the signature or the "whiteness" of the reflectivity sequence. Accordingly, the practical use of this technique and its accuracy are limited.

Other known techniques comprise actually measuring the signature. For instance, in very deep water, the direct wave from the sources to the hydrophone can be measured without interference from reflections from the sea bed and sub-strata. "Ghosting" reflections from the sea surface can be subtracted with a sufficient degree of accuracy to allow the source signature to be directly determined. However, it is generally not convenient to perform such measurements as this generally requires towing the sources and hydrophones to regions of deep water and then returning to a region to be surveyed. Further, the source signature may vary with time. For instance, where the or each source comprises an array of individual sources, such as air guns or water guns, one or more of the individual sources may cease operating during actual surveying, in which case the signature of the whole source will change and will therefore not be known with sufficient accuracy.

Other techniques for measuring the source signature while performing seismic surveys are also known. However, many of these techniques require special data acquisition geometries i.e. special arrangements of sources and/or hydrophones, which are often not available. Examples of such techniques are disclosed in EP-A-0 066 423, in Landr, M. and Sollie, R., 1992, Source signature determination by inversion: Geophysics, 57, 1633–1640, and in Weglein, A. B. and Secrest, B. G., 1990, Wavelet estimation for a multidimensional acoustic or elastic earth: Geophysics, 55, 902–913.

According to a first aspect of the invention, there is provided a method of determining a signature of an energy source as defined in the appended claim 1.

According to a second aspect of the invention, there is provided a method of reducing the effects of multiple reflected energy as defined in the appended claim 11.

Preferred embodiments of the invention are defined in the other appended claims.

It is thus possible to provide a technique which may be applied to marine seismic reflection data to allow source estimation for "prestack" data processing. This technique allows the source signature which permits reduction or removal of events due to first order free-surface reflections to be found. This technique makes use of the formulation of the relationship between free-surface reflections and the source signature as a scattering Born series as disclosed in Carvalho, P. M., Weglein, A. B. and Stolt, R. H., 1991, Examples of a nonlinear inversion method based on the T matrix of scattering theory: Application to multiple suppression: Mtg. Soc. Expl. Geophys., Expanded Abstracts, 1319–1322. The series is constructed exclusively with seismic data and the source signature without any knowledge of the subsurface other than the velocity of sea water. Thus, by using the scattering Born series for removing free-surface multiples, the source signature may be determined without any of the assumptions usually associated with known techniques based on the classical convolution model. Further, special acquisition geometries of sources and receivers are not required. The source signature may be determined directly from data recorded during seismic surveying. Further, the source signature thus determined may be used to reduce or remove the effects of free-surface multiple reflections so as to provide a substantial improvement in the quality of the data before stacking and when other processing techniques are applied.

By using only the first two terms of the inverse scattering series, which is physically equivalent to dealing only with first order free-surface reflections, the relationship between free-surface reflections and the source signature has effectively been made linear as opposed to the nonlinear relationship which applies when higher order free-surface reflections and higher order terms of the inverse scattering series are considered. The mathematical problem of finding the source signature which minimises the "energy" of the seismic data (corresponding to substantially removing the effects of first order free-surface reflections) has an analytical solution and, in many cases, this solution permits the source signature to be determined to a desired degree of precision. However, this precision is limited by truncating the inverse scattering series and, if desired, a better approximation to the source signature may be obtained iteratively, for instance by finding a series of corrections to the source signature which progressively reduce the energy of the seismic data. Such iterations thus correct at least partially for the effects of truncation of the inverse scattering series. This iterative process may be stopped when a sufficient degree of precision has been achieved, for instance when further reductions in energy are not considered significant or when further corrections to the source signature are not considered significant.

The invention will be further described, by way of example, with reference to the accompanying drawings, in which.

For the purpose of illustration, the use of the present invention with marine seismic reflection data will be described in detail. However, these techniques may be applied to situations where multiple reflected energy can be represented by an inverse scattering series.

Figure 1:
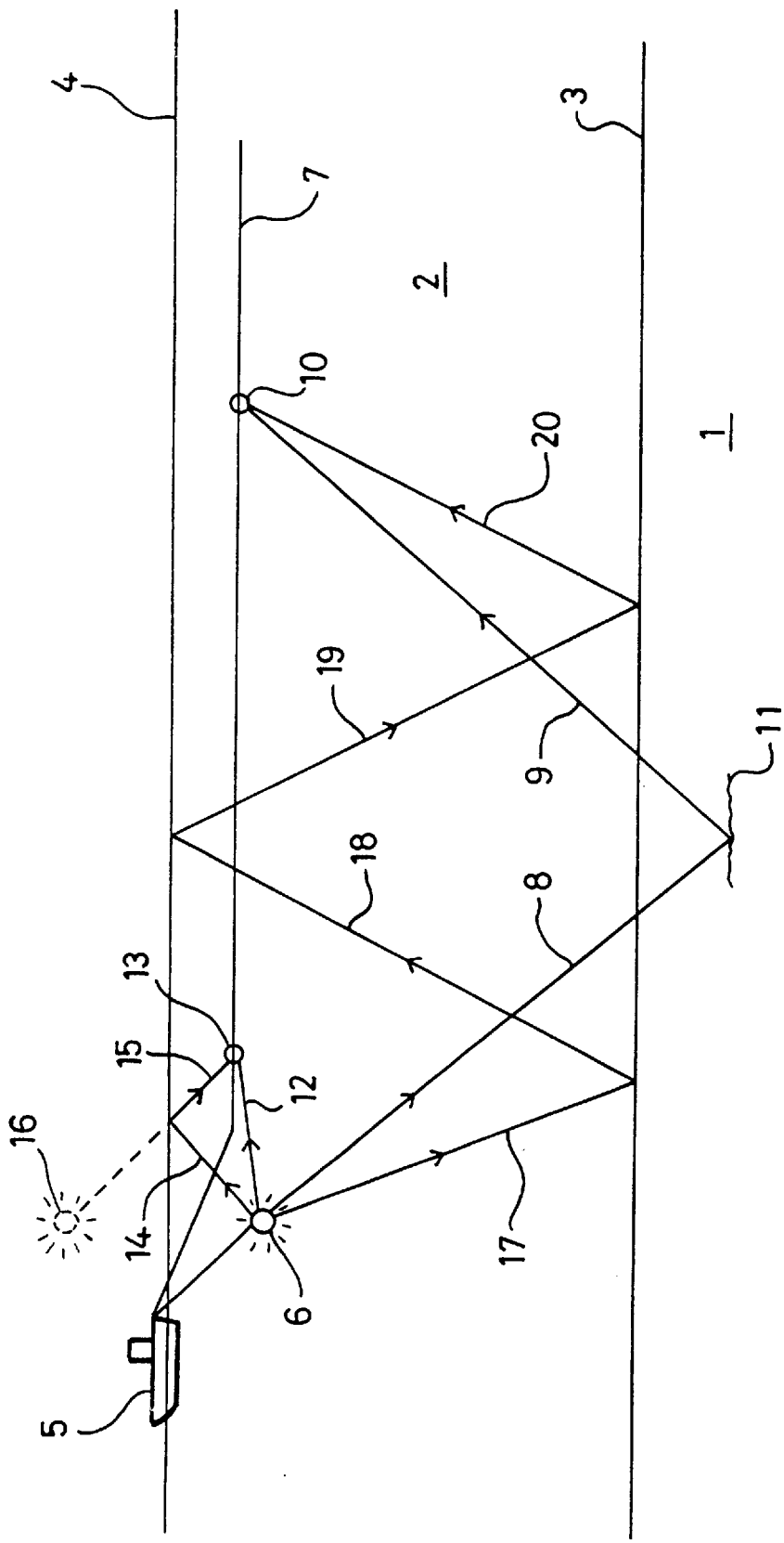
FIG. 1 is a schematic diagram illustrating marine seismic surveying.

FIG. 1 illustrates a typical arrangement for performing marine seismic exploration. The drawing shows a section through the earth 1 below the sea 2 with the sea bed shown at 3 and the sea surface shown at 4. The sea surface 4 constitutes an interface between the air and the water and thus constitutes a free-surface in terms of seismic reflection data. An exploration vessel 5 tows a seismic source 6, for instance comprising an array of air guns. The vessel 5 also tows a seismic "streamer" 7, which is cable several hundreds or thousands of meters in length carrying hydrophones regularly spaced along the cable and connected to data recording apparatus on board the vessel 5. The spacing between adjacent hydrophones is typically of the order of one or a few tens of meters.

During exploration, the vessel 5 tows the source 6 and streamer 7 at relatively low speed along parallel lines above the sea bed 3 while actuating the source 6 at regular intervals. The seismic signals arriving at the hydrophones of the streamer 7 are recorded on board the vessel with or without data processing. The recorded seismic data are generally subjected to further processing elsewhere so as to reveal information about the structure of the earth 1 below the exploration region.

The energy emitted by the source 6 arrives at the hydrophones of the streamer 7 via various different types of propagation paths. The propagation paths which are required for processing of the seismic data to reveal information about the structure of the earth are downward paths such as 8 followed by upward paths such as 9 to a typical hydrophone 10 following a single reflection, for instance at a boundary between different substrata illustrated at 11. However, these reflection data are contaminated with data arriving via other propagation paths. For instance, there is a direct path from the source 6 to each hydrophone, for instance shown as the path 12 to the hydrophone 13. Also, some energy initially travels upwardly from the source 6, for instance shown by the path 14, to be reflected downwardly by the sea surface 4 as shown by the path 15. The energy reflected downwardly by the sea surface 4 also travels to the sea bed 3 and into the earth 1 to be reflected back to the hydrophones. This gives rise to a virtual source shown in broken lines at 16. This effect is known as "ghosting".

In general, direct waves following propagation paths such as 12 and virtual sources 16 resulting from reflection at the sea surface 4 do not cause a problem as their effects can relatively easily be subtracted from the seismic signals received by the hydrophones, such as 10 and 13.

The seismic signals are also contaminated by multiple reflections and other effects such as refractions and diffractions. Multiple reflections can occur within the earth 1. However, the present invention is concerned with free-surface multiple reflections i.e. energy from the source 6 which initially travels downwardly but is received by the hydrophones after at least one downward reflection from the sea surface 4. The propagation of a typical free-surface multiple reflection is shown in FIG. 1. Energy from the source 6 travels initially downwardly along a path 17. Part of the energy is reflected by the sea bed 3 to follow the path 18. This energy is substantially wholly reflected by the sea surface 4 along a path 19 and then again partially reflected upwardly by the sea bed 3 along a path 20 to arrive at the hydrophone 10. Such free-surface multiple reflections are categorised by the number of downward reflections which take place at the free-surface or sea surface 4 following the initial downward propagation of the energy from the source 6. Thus, a first order free-surface multiple reflection undergoes one downward reflection at the surface 4 as shown in FIG. 1. A second order free-surface multiple reflection undergoes two downward reflections at the surface 4, and so on. The present invention provides a technique for determining a signature of the source 6 and provides a technique for removing or reducing the effects of free-surface multiples, as will be described hereinafter.

In order to illustrate this technique, the derivation of the method will be described with respect to a theoretical two-dimensional earth model comprising an inhomogeneous solid half-space overlain by a homogeneous fluid (water) layer. The sea surface 4 constitutes a free-surface because acoustic pressure vanishes in order to avoid infinite acceleration of the surface layer. The reflection coefficient at this interface is almost equal to −1. It is assumed that the signal recorded from a typical hydrophone has had the effects of the direct wave and ghosting removed. Referring to horizontal (x) and vertical (z) spatial coordinates and a time coordinate t, the source position is denoted by $(x_s, z_s)$ and the hydrophone (receiver) position is denoted by $(x_g, z_g)$. The seismic data representing the pressure variation at $(x_g, z_g)$ and at time t for a source located at $(x_s, z_s)$ is given by $D_0(x_s, z_s, t; x_s, z_g)$. By resetting the time variable to zero for each source and simplifying such that $z_g = z_s = 0$, the seismic data may be equivalently represented by $D_0(x_s, x_g, t)$. This is Fourier-transformed to the (w-k) domain with respect to $x_s, x_g, t$ to give $D_0(k_s, k_g, w)$, where $k_s, k_g$, and w are the Fourier-transformed variables corresponding to $x_s, x_g$, and t, respectively. To simplify notation, the Fourier-transformed data will be represented hereinafter by $D_0$, and corresponding simplified notation will be used throughout.

As disclosed by Carvalho, P. M., Weglein, A. B. and Stolt, R. H., 1991, Examples of a nonlinear inversion method based on the T matrix of scattering theory: Application to multiple suppression: Mtg. Soc. Expl. Geophys., Expanded Abstracts, 1319–1322, the scattering Born series for removing events due to free-surface reflections i.e. free-surface multiple reflections, from the seismic data $D_0$ can be written as:

$$D_p = D_0 + AD_1 + A^2 D_2 + \quad (1)$$

where $D_p$ is the data without free-surface multiples and $A = A(w)$ is the inverse of the Fourier-transformed source signature $S(w)$, which is assumed to be only time dependent and not to vary with angle or source position i.e.

$$A = 1/S.$$

The pressure fields $D_1, D_2, \ldots$ are given by $$D_n(k_g, k_s, \omega) = \frac{\omega}{c} \int_{-\infty}^{\infty} dk \cdot \cos\theta \cdot D_o(k_g, k, \omega) D_{n-1}(k, k_s, \omega) \quad (2)$$

where n is a positive integer and $$\cos\theta = \sqrt{1 - \frac{c^2 k^2}{\omega^2}} \quad (3)$$

The constant c is the seismic velocity of water and k is a generic horizontal wave number. The Born series in equation (1) for removing free-surface multiples is as follows. The series is constructed using the (Fourier-transformed) seismic data $D_0$ and the inverse source A only. The first term $D_0$ of the series is the actual data. The second term containing $D_1$ removes first order free-surface multiples. The next term including $D_2$ removes second order free-surface multiples, and so on. Thus, in order to remove the effects of free-surface multiple reflections, knowledge of the source signature, and hence its inverse A, is required.

In order to determine the source signature (via its inverse A), it is necessary to find a solution to the equation (1), which is a polynomial in A. Equation (1) is a polynomial of high order and finding its solutions is therefore a difficult nonlinear problem. However, truncating of the polynomial to its first two terms corresponds to removal of first order free-surface multiples and yields a polynomial of first order which can be solved analytically. Thus, truncating equation (1) to its first two terms gives:

$$D_f = D_0 + AD_1 + \epsilon_T \quad (4)$$

where $D_f$ are the data from which the first order multiples have been removed and $e_T$ describes the effects due to truncation, is small, and is nonlinearly related to the inverse source A.

Removing the effects of first order free-surface multiples reduces the acoustic energy represented by the seismic data. When the source signature is correctly determined, the reduction in energy will be maximized. Thus, it is required to find the source signature for which the energy of $D_f$, i.e. the data after the removal of first order multiples, is minimum. By using the known least squares technique, the signature can be defined by that A which minimizes:

$$S(A) = \|D_f\|^2 + \|A\|^2 \quad (5)$$

where:

$$\|D_f\|_2 = \int dk_g \int dk_s \int d\omega . D_f . W_D . D^*_f \quad (6)$$

and $$\|A\|^2 = \sigma^2 \int dw \int dw' . A(\omega) . W_A^{-1}(\omega, \omega') . A^*(\omega') \quad (7)$$

The asterisk denotes complex conjugate. $W_D = W_D(k_s, k_g, w)$ is a weighting function describing errors in the data and $W_A(w, w')$ describes a priori information about the source. The term $\|A\|^2$ is introduced to guarantee the stability of the solution. To simplify subsequent inversion formulae, the constant $s^2$ has been introduced into the definition of $\|A\|^2$. This criterion corresponds to finding the source which minimizes the energy of data after the removal of the first order multiples. The source signature which permits the removal of the first order multiples will also permit the removal of higher order multiples so that, by finding the source signature in accordance with this technique, it may be used in equation (1) to remove free-surface multiples up to any desired order.

The a priori information described by the weighting function $W_A(\omega,\omega')$ may be derived, for instance, from a deterministic estimate of the source signature, for instance using the technique disclosed in EP-A-0 066 423. Thus, a priori knowledge such as smoothness of the source spectrum may be incorporated through correlation between frequencies.

In order to solve equation (5) so as to find the (inverse) source signature A, an initial analytical solution to equation (5) can be found (by ignoring the truncation errors ($\epsilon_T$)) by inversion to give:

$$A^{(O)} = -\frac{\int d\omega' \cdot W_A(\omega, \omega') \cdot N(\omega')}{\sigma^2 + \int d\omega' \cdot W_A(\omega, \omega') \cdot Q(\omega')} \quad (8)$$

where $$N(\omega) = \int dk_g \int dk_s . D_0 . W_D . D_1^* \quad (9)$$

and $$Q(\omega) = \int dk_g \int dk_s D_1 . W_D . D_1^* \quad (10)$$

and $A^{(O)}$ is the initial solution.

In some circumstances, the initial solution will comprise a sufficiently accurate and precise determination of the source signature so that it may then be substituted into equation (1) so as to provide data $D_P$ in which free-surface multiple reflections have been attenuated to a sufficient degree. Also, the signature thus determined may be used for other purposes, for instance during subsequent data processing. However, where a more accurate determination of the source signature is required, this may be achieved by setting up an iterative scheme, of which $A^{(O)}$ is the starting solution, in order to accommodate the truncation errors which were ignored in the analytical solution represented by equation (8). Effectively, the nonlinear part of the problem is solved through the iterative linear solutions.

Initialisation of the iterative scheme is as follows:

$$D_f^{(0)} = D_0 + A^{(O)} . D_1 \quad (11)$$

and $$D_0^{(1)} = D_f^{(0)} \quad (12)$$

In general, $A^{(O)}$ permits a significant reduction of first order multiple energy through $D_f^{(0)}$. The iterations are set up to find the correction to $A^{(O)}$ which allows the removal of the remaining first order free-surface multiple energy.

For each $D_0^{(n)}$ representing data containing the residual energy of the first order multiples, $D_1^{(n)}$ can be found from equation (2). The correction $\delta A^{(n)}$ to $A^{(n-1)}$ can then be found by minimizing $$S(\delta A^{(n)}) = \|D_f^{(n)}\|^2 + \|\delta A^{(n)}\|^2 \quad (13)$$

This equation can be solved analytically in accordance with equation (8). $D_0$ is then replaced by $D_0^{(n)}$ and $D_1$ is replaced by $D_1^{(n)}$. Finally, the source signature is updated in accordance with:

$$A^{(n)} = A^{(n-1)} + \delta A^{(n)} \quad (14)$$

and the data are updated in accordance with $$D_f^{(n)} = D_0^{(n)} + \delta A^{(n)} . D_1^{(n)} \quad (15)$$

$$D_0^{(n-1)} = D_f^{(n)} \quad (16)$$

This iterative process may be stopped at any appropriate stage, for instance when a predetermined criterion is met. For instance, the iterations may be stopped when two successive solutions $A^{(n)}$ and $A^{(n-1)}$ are sufficiently close (the absolute value of $\delta A^{(n)}$ is less than a predetermined value). Alternatively, the iterations may be stopped when the reduction in energy represented by the data is less than a predetermined amount.

When the source signature has been found to a required precision, it may be substituted into equation (1). This equation may be truncated at any desired term so as to remove or reduce the effects of free-surface multiples of orders up to and including the highest order of A in the truncated form of equation (1).

In practice, the updated first order multiple term, $D_1^{(n)}$, in equation (15), can be kept identical to the initial first order multiple term, $D_1$ because primary energy remains unchanged through iterations.

The seismic reflection data required as the input for this technique are "shot gathers", for instance as described with reference to FIG. 1, regularly sampled in space and time. It is assumed that de-ghosting correction and subtraction of the direct waves have been performed on the input data. No assumptions of wavelet structure or phase are required in order for the technique to be performed. However, the source signature determined by this technique may be different from the actual source signature, depending on the effects of preprocessing of the data.

The weighting function $W_A$ allows any a priori information about the source wavelet to be taken into account. For instance, in order to ensure that the source spectrum is smooth, this weighting function may be given as follows:

$$W_A(\omega, \omega') = \mathrm{sinc}\left[\frac{(\omega - \omega')T}{2}\right] \quad (17)$$

The weighting function $W_D$ describes errors in the data. It may be used to ensure that certain parts of the data do not dominate the solution. For instance, this weighting function may be given by the following:

$$W_D(k_g, \omega) = \begin{cases} k_g^4 & \text{if } |k_g| < k_r \\ k_T^3 & \text{elsewhere} \end{cases} \quad (18)$$

where $k_T$ is about one tenth of the maximum wave number. Such a function reduces the influence of wave numbers in the neighbourhood $k_g = 0$ (i.e. near the zero offset data) on the solution.

The derivation of the present technique has been exemplified for a two dimensional earth model. However, this can readily be modified to a three dimensional earth model with point sources. This simply requires that, in equations (9) to (16), the wave numbers $k_s$ and $k_g$ are replaced by vector wave numbers $$k_s = \begin{Bmatrix} k_{sx} \\ k_{sy} \end{Bmatrix} \quad (19)$$

$$k_g = \begin{Bmatrix} k_{gx} \\ k_{gy} \end{Bmatrix}$$

Further, the inverse source signature can be derived in the (x-w) domain. In this case, equation (8) becomes:

$$A^{(O)} = -\frac{\int d\omega' \cdot W_A(\omega, \omega') \cdot N(\omega')}{\sigma^2 + \int d\omega' \cdot W_A(\omega, \omega') \cdot Q'(\omega')} \quad (20)$$

where $$N(\omega) = \int dx_g \int dx_s . D_0(x_s, x_g, \omega) D_1^*(x_s, x_g, \omega) \quad (21)$$

and $$Q(\omega) = \int dx_g \int dx_s . D(x_s, x_g, \omega) W_D(x_s, x_g, \omega) D_1^*(x_s, x_g, \omega) \quad (22)$$

The fields $D_0(x_s,x_g,w)$ and $D_1(x_s,x_g,w)$ are the temporal Fourier transforms of $D_0(x_s,x_g,t)$ and $D_0(x_s,x_g,t)$, respectively. The weighting functions $W_D(x_s,x_g,w)$ and $W_A(w,w')$ must be suitably chosen for this domain.

If, in addition to time variations, the source signature varies with angle or shot position, then the technique described hereinbefore can be performed for $A(w,k_s)$ instead of $A(w)$ in the (w-k) domain or for $A(w,x_s)$ instead of $A(w)$ in the (x-w) domain.

FIGS. 2 to 13 illustrate the use of this technique on synthetic data relating to an acoustic model of the earth comprising two homogeneous horizontal layers overlying a homogeneous half space. The depth of the two horizontal interfaces are 120 and 285 meters. With increasing depth, the velocities of the layers and the half space are 1500 meters per second, 2000 meters per second, and 2500 meters per second. A synthetic shot point gather was generated comprising 83 receivers with a spacing of 12.5 meters.

Figure 2:
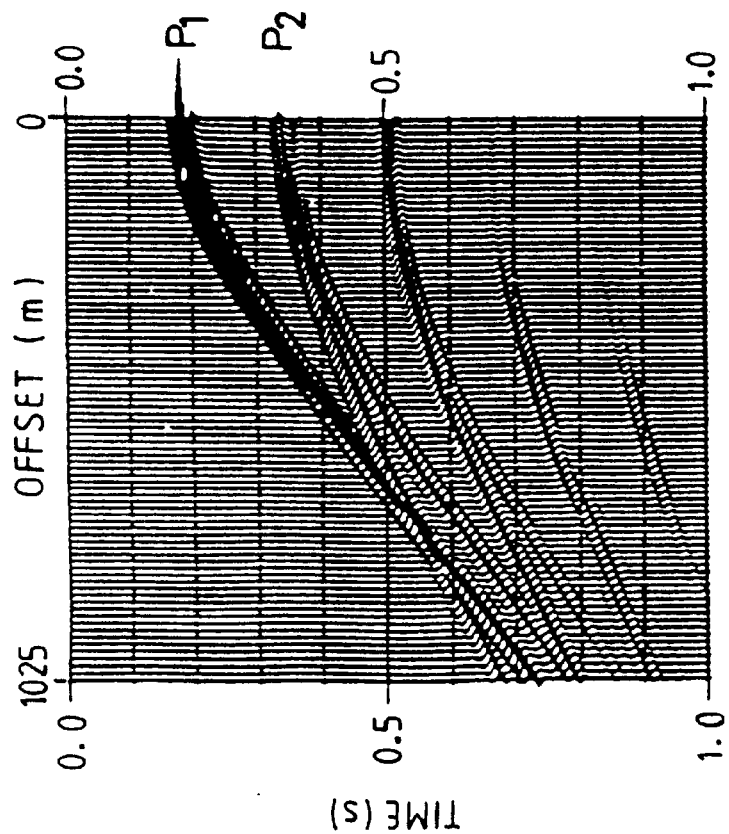
FIG. 2 is a graph illustrating synthetic seismic reflection data as time against offset showing the effect of free-surface multiple reflections.

FIG. 2 shows the synthetic data as a graphical representation of recorded receiver data against receiver offset i.e. in the usual way for recorded seismic data. The data contain two primaries P1 and P2 but several free-surface multiples. This corresponds to the first term D0 in equation (1).

Figure 3:
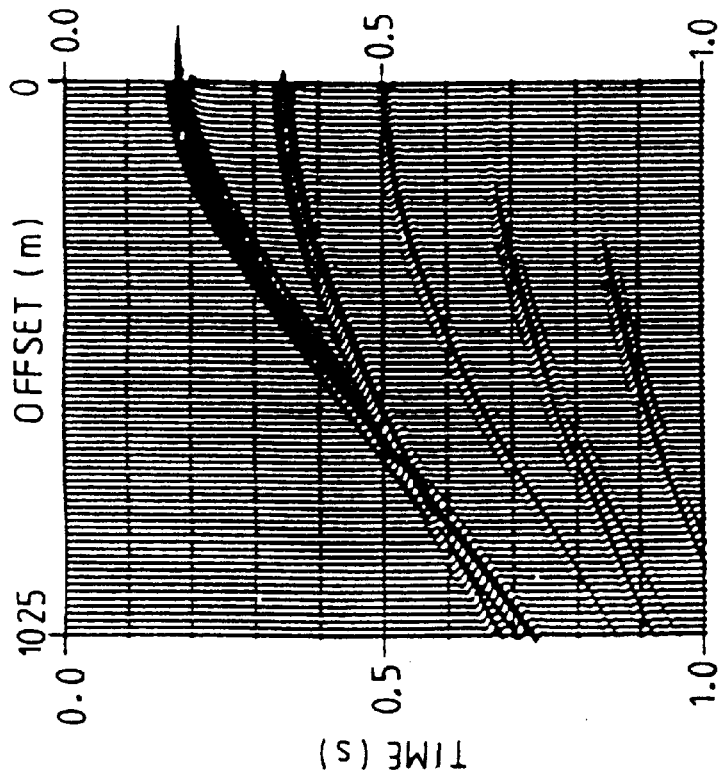
FIG. 3 is a graph similar to that of FIG. 2 illustrating removal of the first order free-surface multiple reflections.
Figure 5:
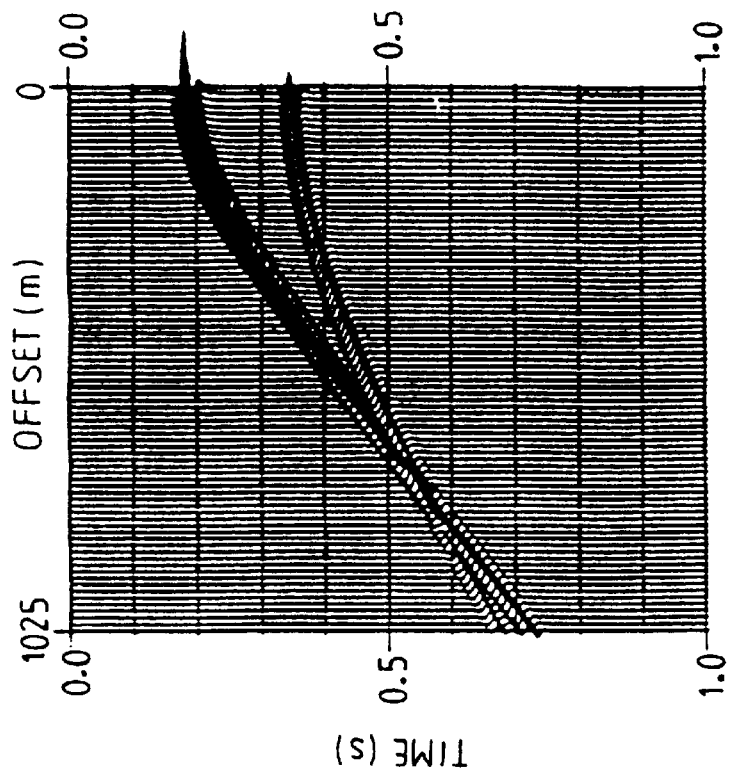
FIG. 5 is a graph similar to that of FIG. 2 illustrating removal of first, second, and third order free-surface multiple reflections.
Figure 4:
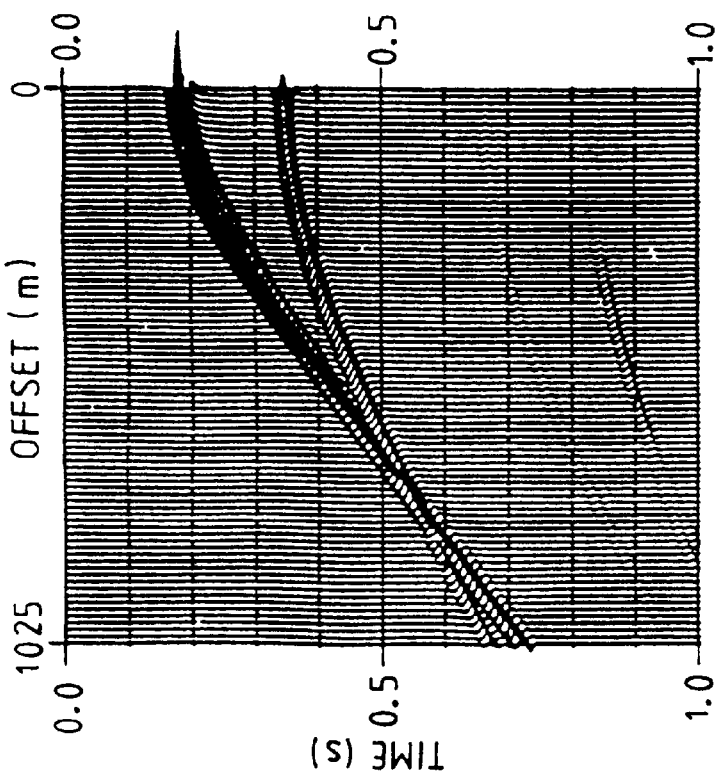
FIG. 4 is a graph similar to that of FIG. 2 illustrating removal of first and second order free-surface multiple reflections.
Figure 6:
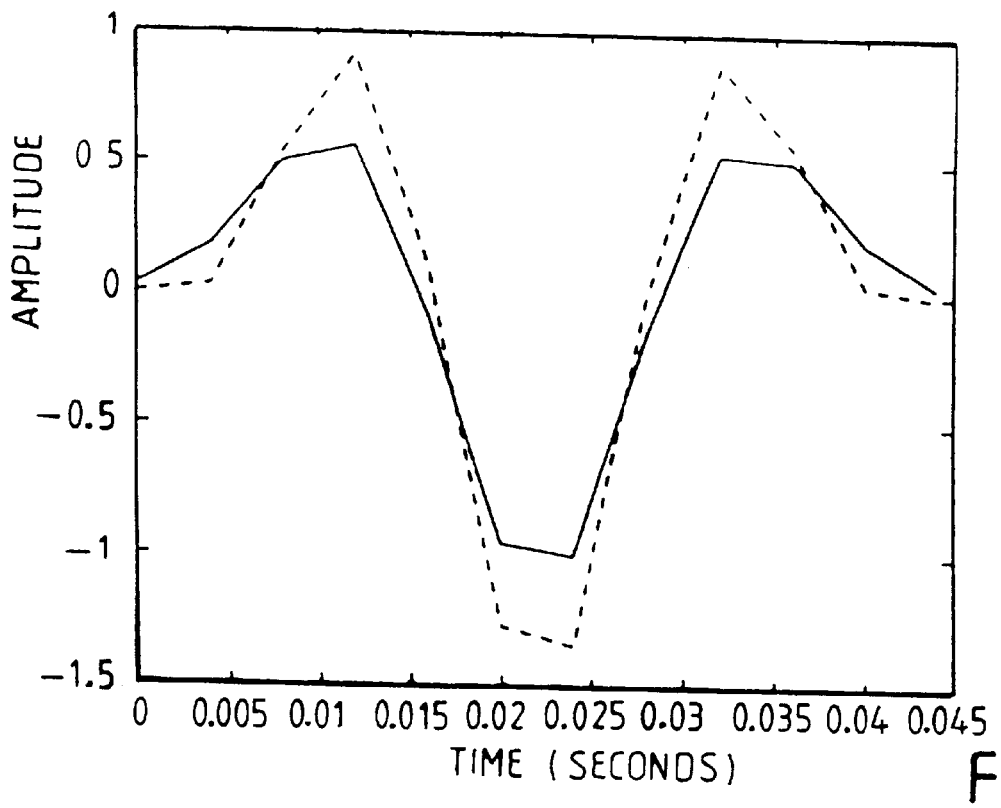
FIG. 6 is a graph of amplitude against time showing the amplitude spectrum of the actual source signature and the initial estimated source signature corresponding to the data shown in FIG. 2.
Figure 7:
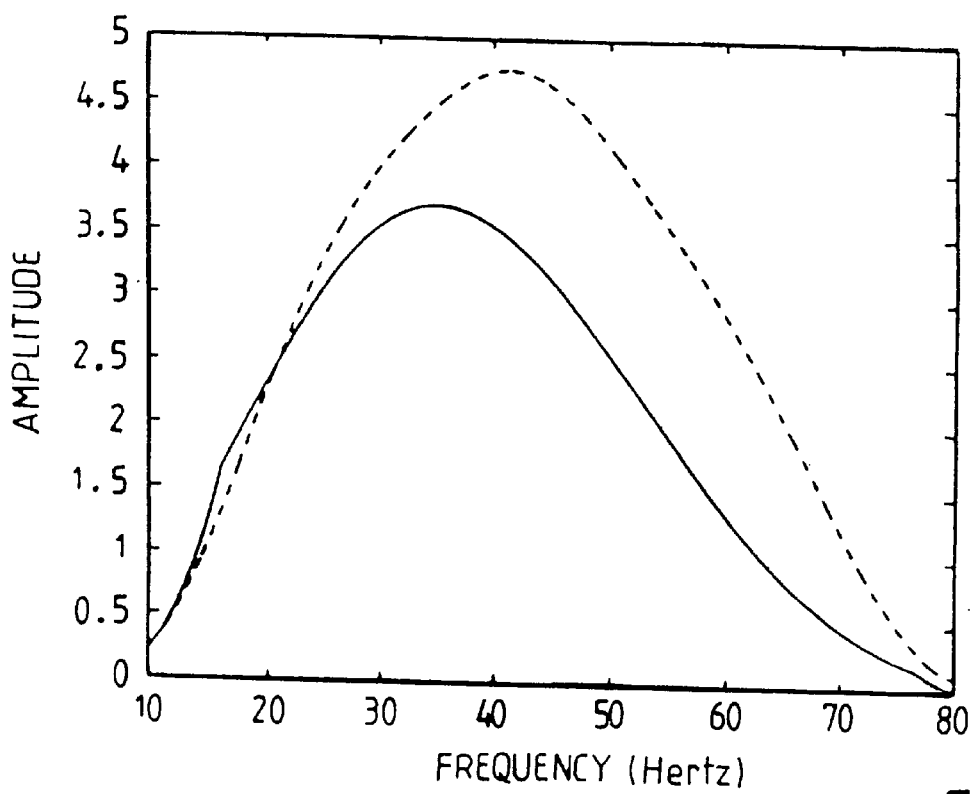
FIG. 7 is a graph of amplitude against frequency showing the frequency spectrum of the actual source signature and the initial estimated source signature corresponding to the data shown in FIG. 2.
Figure 8:
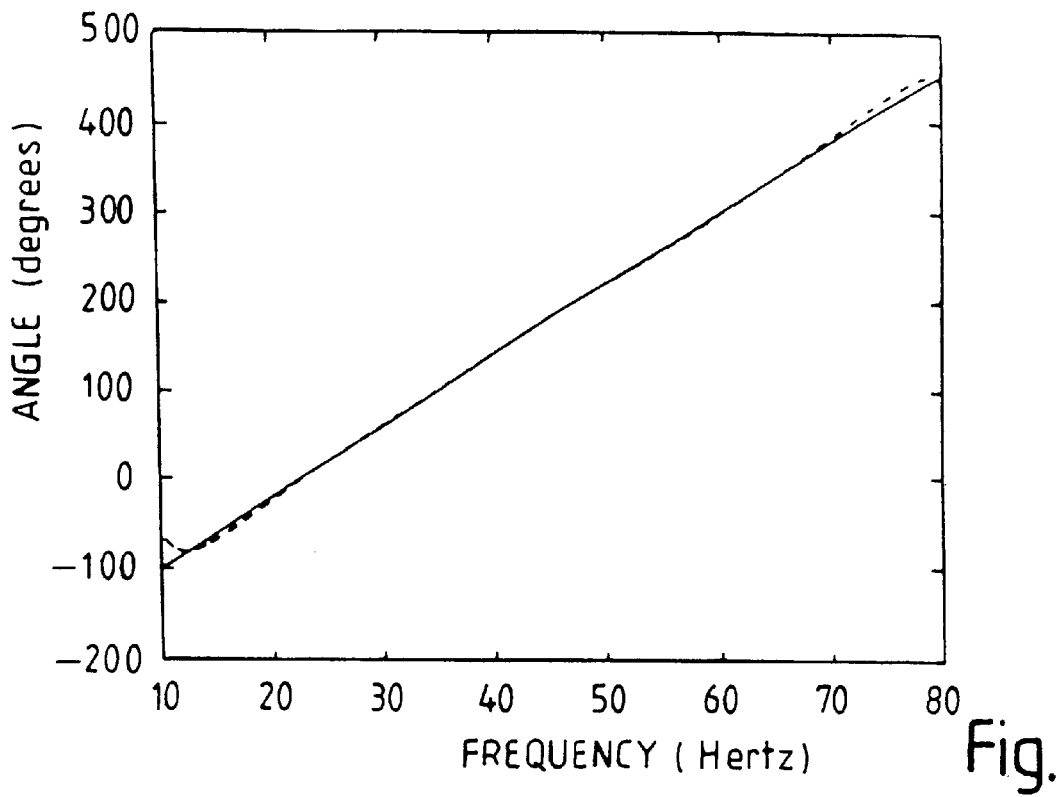
FIG. 8 is a graph of phase angle against frequency showing the phase spectrum of the actual source signature and the initial estimated source signature corresponding to the data shown in FIG. 2.
Figure 9:
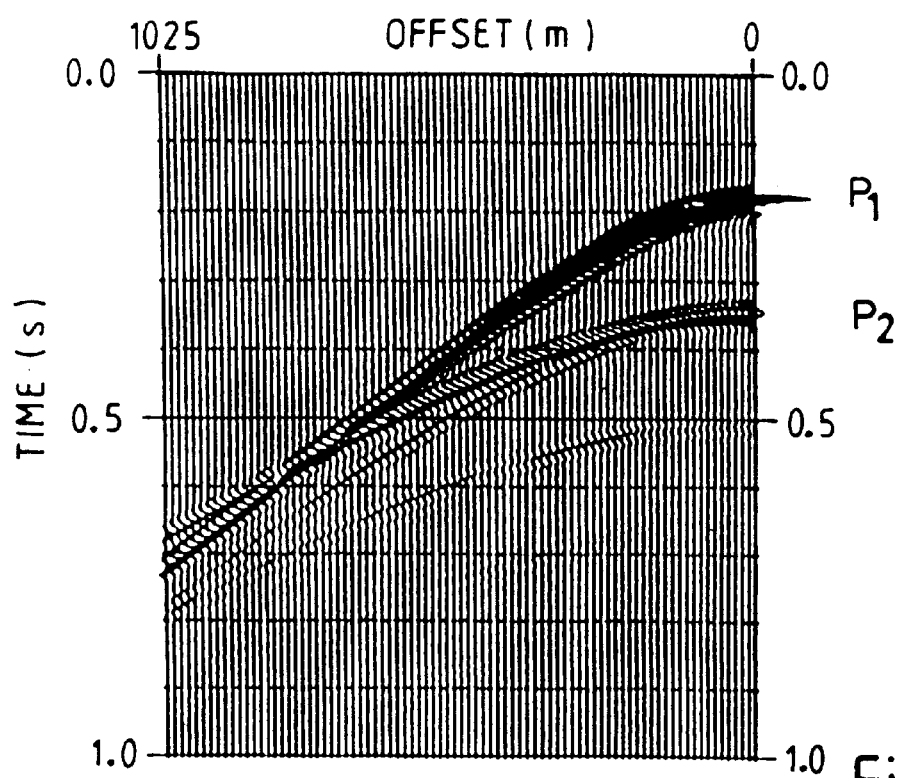
FIG. 9 is a graph similar to that shown in FIG. 2 illustrating the seismic data after removal of free-surface multiple reflections using the initial estimated source signature shown in FIG. 6.
Figure 10:
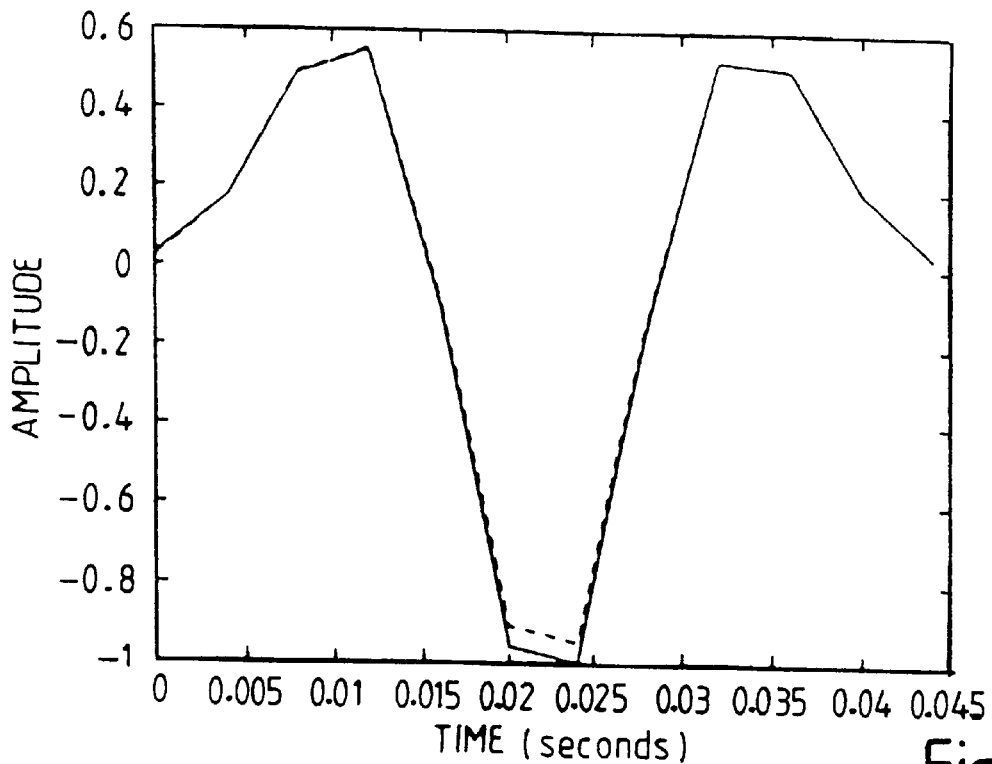
FIGS. 10 to 13 correspond to FIGS. 6 to 9, respectively, and illustrate the estimated source signature and the effects of multiple removal after five iterations to reduce the energy of the seismic data.
Figure 11:
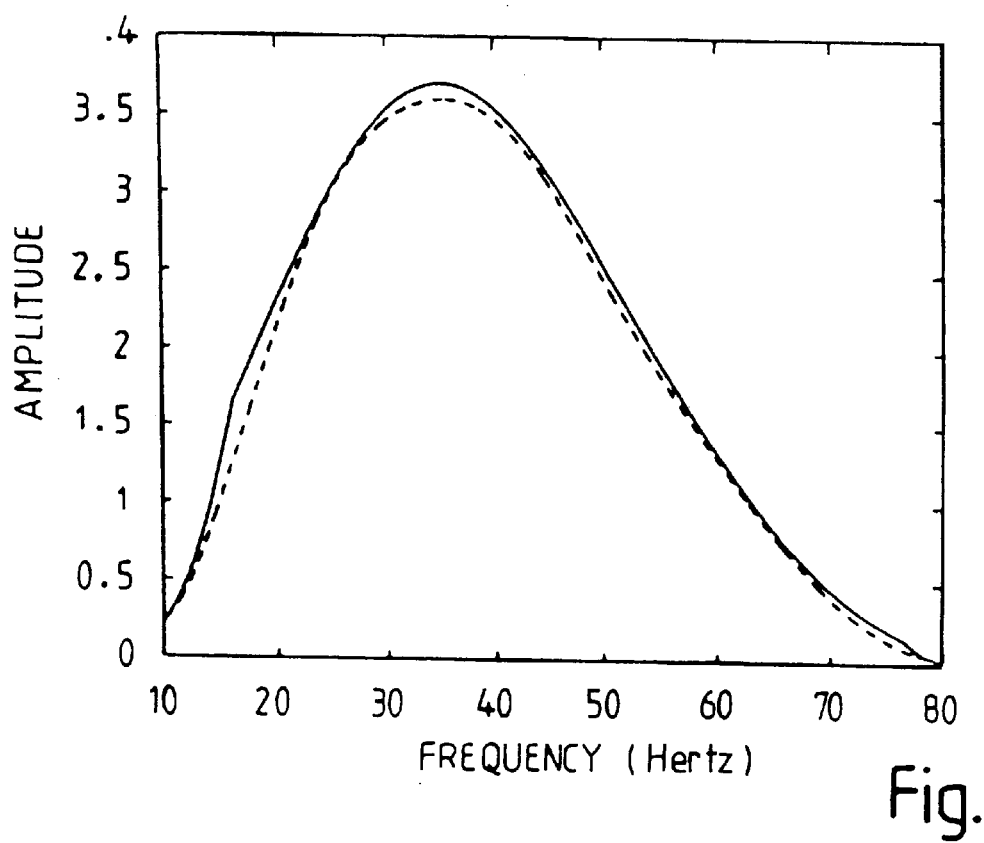
Figure 12:
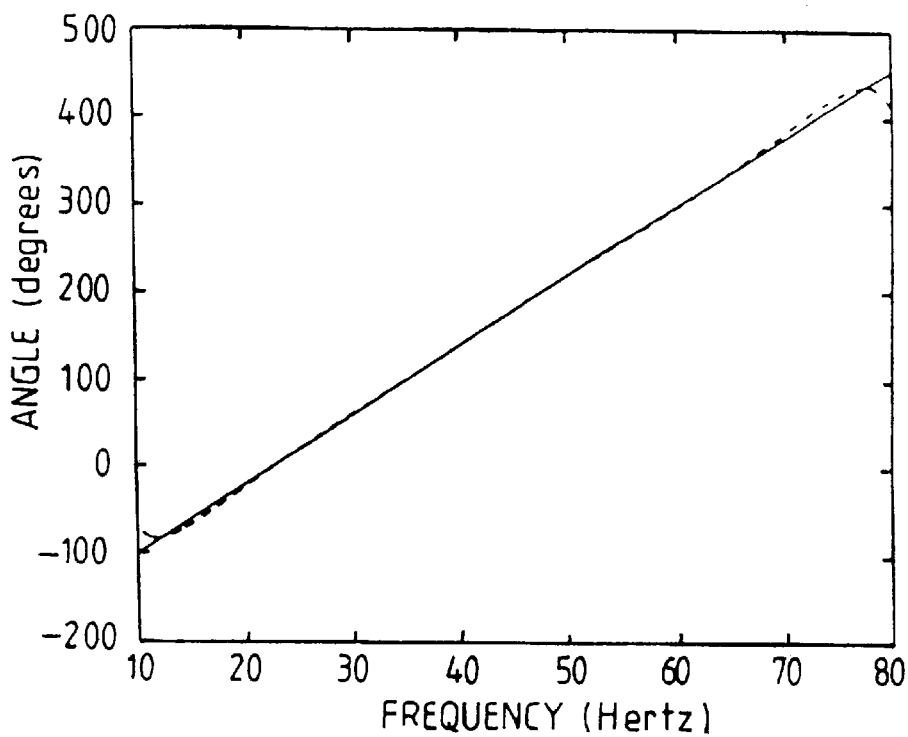
Figure 13:
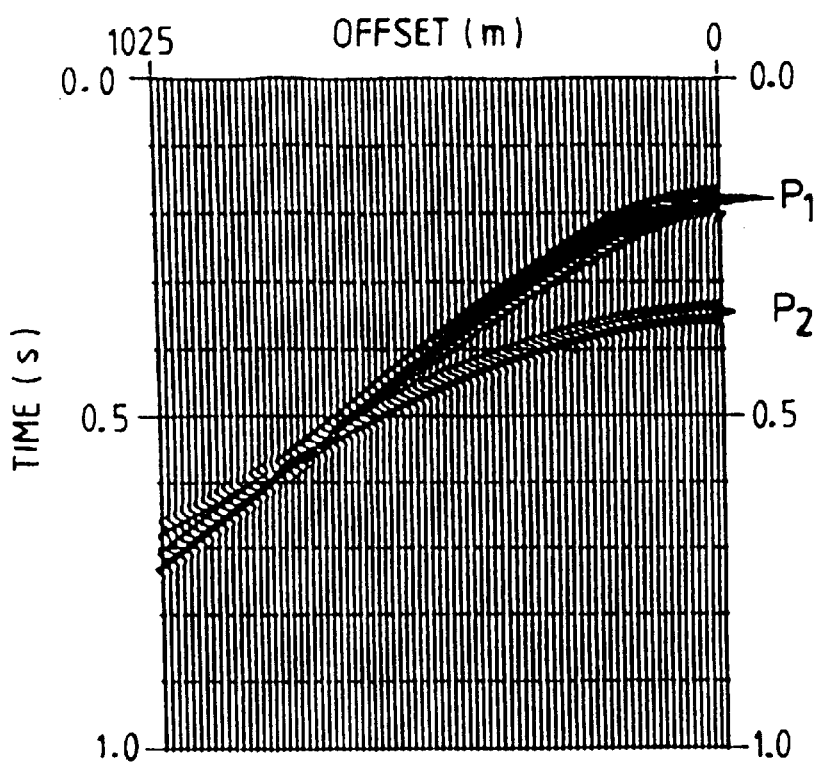
Figure 14:
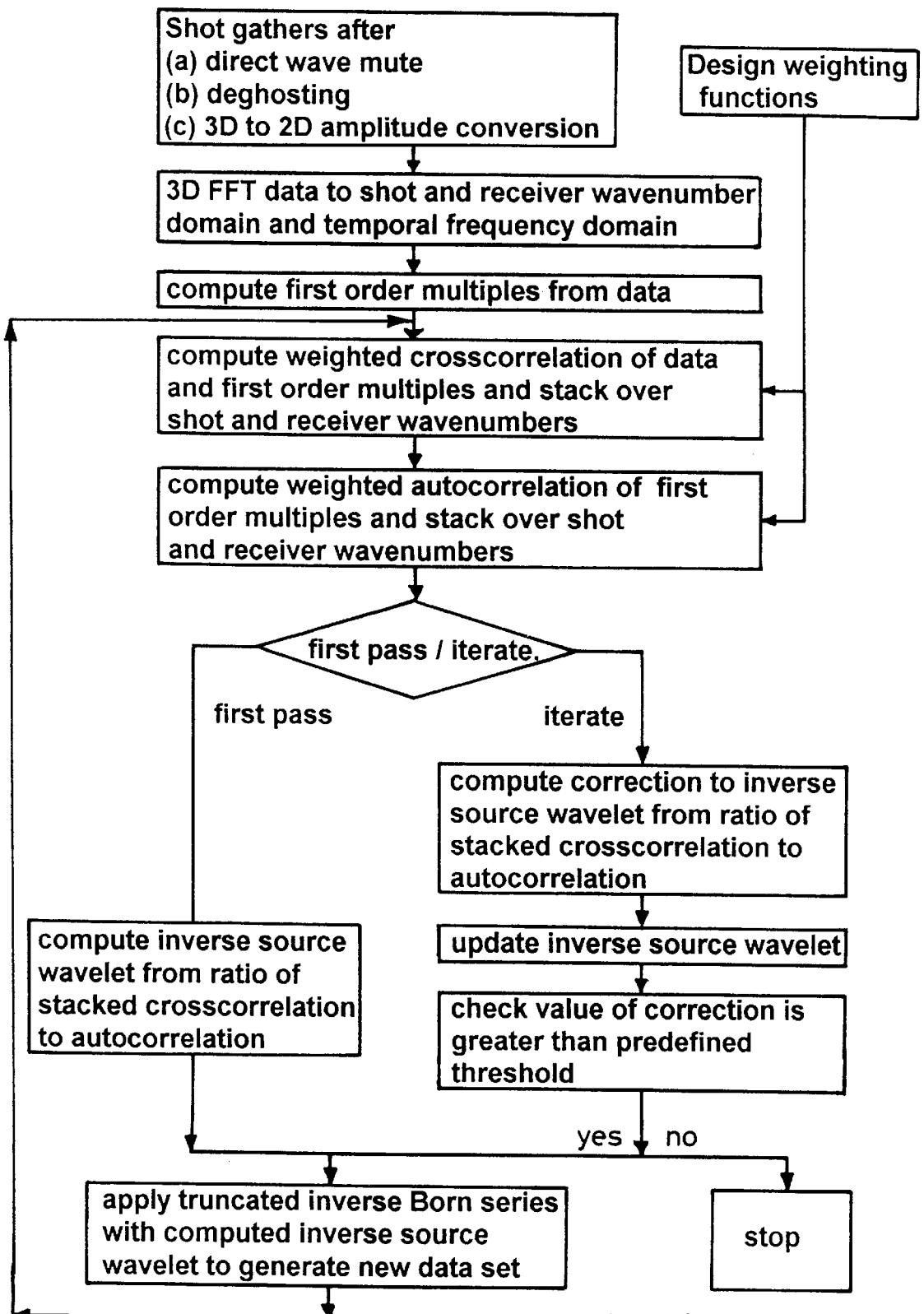
FIG. 14 is a flow-chart illustrating an example in accordance with the invention.

FIG. 3 shows the first two terms $D_0+AD_1$ of equation (1). This shows the effect of removing first order free-surface multiples. Similarly, FIG. 4 shows the first three terms $D_0+AD_1+A^2D_2$, thus representing removal of the first and second order free-surface multiples. FIG. 5 shows the first four terms $D_0+AD_1+A^2D_2+A^3D_3$ i.e. with the first, second and third order multiples removed. FIGS. 6 to 8 show the source signature or wavelet, the amplitude spectrum, and the phase spectrum, respectively, of the actual source signature (solid lines) and the initial estimated source signature (broken lines) before iteration to reduce the effects of truncation as described hereinbefore. Thus, most of the main characteristics of the source have been recovered by the first estimation. In particular, the phase of the estimated source signature matches well with that of the actual source signature. The result of free-surface multiple removal using this estimated source signature is shown in FIG. 9. Some residual energy remains, for first order multiples in particular. FIGS. 10 to 13 correspond to FIGS. 8 to 9, respectively, but illustrate the result after five iterations. The match between the actual and estimated source signatures has significantly improved as shown in FIGS. 10 to 12. As shown in FIG. 13, all of the free-surface multiple reflections have been successfully removed so that only the primaries remain.

It is thus possible to provide a technique which permits the signature of a seismic source to be determined without requiring any assumptions (about the source amplitude or phase or about the subsurface except the velocity of water in the marine survey) and without requiring any special configurations of hardware. Further, it is possible to provide a technique based on such source signature estimation to allow the effects of free-surface multiple reflections to be reduced or removed from seismic reflection data.

The following situations generate multiple reflected energy in a manner similar to that of the marine seismic example described in detail hereinbefore. In such situations, the multiple energy can be used to estimate the source signature which can then be used for the removal or reduction of the multiple energy.

(1) In vertical seismic profiling (VSP) applications, energy sources are located on the surface and receivers are located in the subsurface along a bore hole. Geophones closer to geological horizons can provide a more detailed stratigraphic picture.

(2) Measurements can be derived from acoustic sources and receivers in a bore hole. Acoustic sources in a bore hole may be used to determine (a) the corrosion of the outer surface of the pipe, (b) the third interface i.e. the bore hole wall, and (c) formation properties near the bore hole. These technologies are relevant to well development for drilling to production. Receivers are either coincident with the source or offset from it along the bore hole. The frequency range and radiation pattern of the source differ with different applications. In applications (b) and (c), reverberation of the wave in the pipe can have a deleterious and disadvantageous effect.

(3) In ground penetrating radar, electromagnetic reflection recorded on the surface of the earth is used to estimate near-surface properties.

(4) In medical imaging and non-destructive material evaluation applications, a sample is irradiated with energy, such as x-rays or ultrasound, in order to determine the internal structure of the sample non-invasively.

We claim:

1. A method of estimating a wavelet representing output from an energy source comprising:

constructing an inverse scattering series which represents multiple reflected energy and which comprises a polynomial in an inverse of a source signature and has recorded data as the first term thereof;

selecting a sub-series comprising two terms of the inverse scattering series, the two terms comprising the first term and an Nth order term where N is a positive integer; and estimating a value of the inverse signature which substantially minimizes the energy represented by the sub-series.

2. A method of estimating a wavelet representing output from a marine seismic energy source comprising:

constructing an inverse scattering series which represents multiple reflected energy and which comprises a polynomial in an inverse of the signature and has recorded marine seismic data as the first term thereof;

selecting a sub-series comprising two terms of the inverse scattering series, the two terms comprising the first term and the Nth order term where N is a positive integer equal to 2; and estimating a value of the inverse signature which substantially minimizes the energy represented by the sub-series, comprising analytically solving an expression for energy minimization of the sub-series to determine the inverse signature.

3. A method as claimed in claim 2, further comprising:

replacing the first term of the sub-series by the preceding value of the sub-series;

replacing the inverse signature in the sub-series by an inverse signature correction to form a modified sub-series;

determining the value of the inverse signature correction which substantially minimizes the energy represented by the modified sub-series; and adding the inverse signature correction to the inverse signature.

4. A method as claimed in claim 3, in which the steps of replacing the first term and replacing the inverse signature are repeated until a predetermined criterion is achieved.

5. A method as claimed in claim 4, in which the predetermined criterion is that the inverse signature correction is less than a predetermined value.

6. A method as claimed in claim 4, in which the predetermined criterion is that the absolute value of the difference between consecutive values of the energy represented by the sub-series is less than a predefined value.

7. A method of determining a signature of an energy source comprising:

constructing an inverse scattering series which represents multiple reflected energy and which comprises a polynomial in an inverse of the signature and has recorded data as the first term thereof;

selecting a sub-series comprising two terms of the inverse scattering series, the two terms comprising the first term and an Nth order term where N is a positive integer; and determining a value of the inverse signature which substantially minimizes the energy represented by the sub-series and wherein the recorded data comprise transformed recorded data.

8. A method as claimed in claim 1, in which the recorded data comprise recorded data preprocessed to remove or reduce direct wave and ghost effects.

9. A method of determining a signature of an energy source comprising:

constructing an inverse scattering series which represents multiple reflected energy and which comprises a polynomial in an inverse of the signature and has recorded data as the first term thereof;

selecting a sub-series comprising two terms of the inverse scattering series, the two terms comprising the first term and an Nth order term where N is a positive integer; and determining a value of the inverse signature which substantially minimizes the energy represented by the sub-series, in which the recorded data comprise marine seismic data.

10. A method as claimed in claim 1, in which the recorded data comprise prestack seismic data.

11. A method of reducing the effects of multiple reflected energy in recorded data, comprising:

selecting the first M terms, where M is an integer greater than 1, of an inverse scattering series which represents free-surface multiple reflections and which comprises a polynomial in an inverse of an energy source signature;

estimating a wavelet representing output from an energy source by a method as claimed in claim 1; and substituting the determined signature into the selected first M terms to form data in which the effects of free-surface multiple reflections are reduced.

* * * * *